Patented Sept. 2, 1952

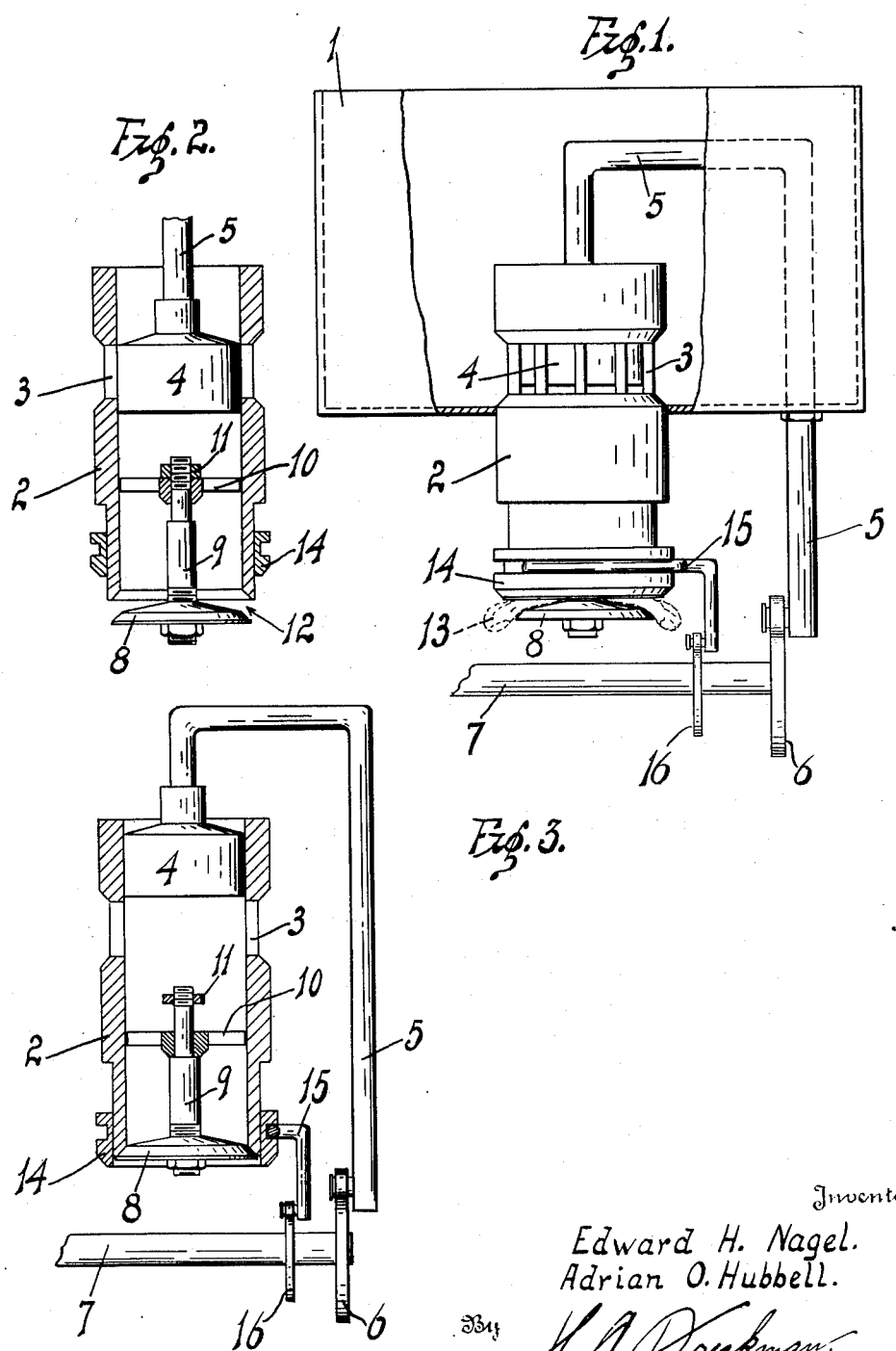

2,608,940

UNITED STATES PATENT OFFICE 2,608,940

DOUGHNUT DOUGH DISPENSER

Edward H. Nagel and Adrian O. Hubbell, Long Beach, Calif., assignors to Coma F. Norris, Long Beach, Calif.

Application April 8, 1947, Serial No. 740,224

4 Claims. (Cl. 107—14)

This invention relates to a doughnut dough dispenser wherein the dough is automatically extruded, formed and cut to produce a complete doughnut ready for frying.

An object of our invention is to provide a novel doughnut dough dispenser wherein the dough is automatically urged into a cylinder and is then extruded from this cylinder and is finally automatically cut off to produce a complete doughnut ready for frying.

Another object of our invention is to provide a novel doughnut dough dispenser of the character stated in which a valve is provided at the bottom of the cylinder, the valve closing automatically when the piston moves upwardly to take a new charge and drops to the open position to form an extruding passage, when the pressure is exerted on the dough by the reciprocating piston.

A feature of our invention is to provide a novel doughnut dough dispenser which is simple in construction, effective in operation and which will automatically form and cut the dough ready for frying.

Other objects, advantages and features of invention may appear from the accompanying drawing, the subjoined detailed description and the appended claims.

In the drawing:

Figure 1 is a side elevation of our doughnut dough dispenser with parts of the tank broken away to show interior construction.

Figure 2 is a longitudinal sectional view of the cylinder.

Figure 3 is a longitudinal sectional view of the cylinder and showing the piston and cutter actuating arms.

Referring more particularly to the drawing, the numeral 1 indicates a tank which contains the dough, of the proper consistency. A cylinder 2 is fixedly mounted in the bottom of the tank 1 and the upper part of the cylinder projects into the tank while the lower part of the cylinder depends from the tank.

A plurality of ports 3 are formed in the side of the piston 2 and are positioned within the tank 1 and adjacent the bottom thereof, so that the dough naturally flows into the cylinder by gravity. A piston 4 is reciprocally mounted within the cylinder 2, and its complete stroke is from the position shown in Figure 3 to a point just above the stem of the valve, which will be further described. This movement of the piston opens and closes the ports 3. In the raised position of the piston dough flows into the cylinder 2, and as the piston moves downwardly, the ports 3 are closed thereby, and pressure is exerted on the dough to force it out of the bottom of the cylinder.

The piston 4 is reciprocated by a rod 5 which extends downwardly through the bottom of the tank 1 and is reciprocated by the cam 6 on the shaft 7. The shaft 7 is power driven by any suitable means not shown. A valve 8 fits into the bottom of the cylinder 2 and this valve is mounted on a stem 9, the stem being slidable in the spider 10. A nut 11 on the stem engages the top of the spider to limit the downward movement of the valve 8. In the lower position of the valve 8, an extruding space 12 is provided through which the dough passes, as shown in dotted lines 13. When the dough is forced out of the space 12 as shown in Figure 1, a cutter ring 14 moves downwardly to cut the mass of dough and permit it to drop downwardly into the frying pan. When the piston 4 reaches the position shown in Figure 2, pressure is exerted on the dough and it is then extruded through the opening 12, and after a dough mass is so extruded, the cutter ring 14 descends and cuts it off.

The cutter ring 14 is actuated by the rod 15, this rod in turn being reciprocated by a suitable cam 16 on the shaft 7. When the piston 4 moves upwardly, the partial vacuum created within the cylinder will close the valve 8 automatically, and as the piston 4 moves above the ports 3, an additional charge of dough will enter the cylinder so that this cylinder is full and ready for the next downward movement of the piston to extrude another doughnut.

Having described our invention, we claim:

1. A doughnut dough dispenser comprising a tank, a cylinder mounted in said tank and depending therefrom, said cylinder having intake ports therein positioned within the tank and adjacent the upper end of the cylinder, a piston reciprocally mounted in the cylinder, said piston moving over said ports to open and close the ports, means to reciprocate said piston, and cutter means on the lower end of said cylinder, said cutter means including a ring slidably mounted on the cylinder, and means to reciprocate said ring, synchronously with the piston, and a valve mounted for free vertical movement in the lower end of the cylinder.

2. A doughnut dough dispenser comprising a tank, a cylinder mounted in the tank and depending therefrom, said cylinder having intake ports therein positioned within the tank and adjacent the upper end of the cylinder, a piston in said cylinder, said piston moving over said ports to open and close the ports, means to reciprocate said piston, a valve mounted in the lower end of said cylinder, and cutter means on the lower end of said cylinder and means to reciprocate the cutter means synchronously with the piston, a stem on the valve, said stem being slidably mounted on the cylinder, for free vertical movement therein.

3. A doughnut dough dispenser comprising a tank, a cylinder mounted in the tank and depending therefrom, said cylinder having intake ports therein positioned within the tank and adjacent the upper end of the cylinder, a piston in said cylinder, said piston moving over said ports to open and close the ports, means to reciprocate said piston, a valve mounted for free vertical movement in the lower end of said cylinder, and cutter means on the lower end of said cylinder, said cutter means including a ring slidably mounted on the cylinder, and means to reciprocate said ring.

4. A doughnut dough dispenser comprising a tank, a cylinder fixedly mounted in the tank and depending therefrom, said cylinder having intake ports therein positioned within the tank and adjacent the upper end of the cylinder, a piston reciprocally mounted in said cylinder, said piston moving over said ports to open and close the ports, power means to reciprocate said piston, a valve mounted in the lower end of said cylinder for free vertical movement relative to said cylinder, cutter means reciprocally mounted on the lower end of said cylinder, said cutter means including a ring slidably mounted on the outside of the cylinder, and power operated means to reciprocate said ring, synchronously with the piston.

EDWARD H. NAGEL.
ADRIAN O. HUBBELL.

REFERENCES CITED

The following references are of record in the file of this patent:

UNITED STATES PATENTS

| Number | Name | Date |
|---|---|---|
| 1,776,780 | Carpenter | Sept. 30, 1930 |
| 1,798,582 | Bergner | Mar. 31, 1931 |
| 1,829,120 | Toews | Oct. 27, 1931 |
| 2,023,658 | Ahacich | Dec. 10, 1935 |
| 2,166,260 | Mosher | July 18, 1939 |
| 2,256,617 | Kipnis | Sept. 23, 1941 |
| 2,317,897 | Ellis | Apr. 27, 1943 |